(12) United States Patent
Kruger

(10) Patent No.: US 6,236,911 B1
(45) Date of Patent: May 22, 2001

(54) LOAD MONITORING SYSTEM AND METHOD UTILIZING TRANSPONDER TAGS

(75) Inventor: Johan Dawid Kruger, Witkoppen (ZA)

(73) Assignee: Supersensor (Proprietary) Limited, Midrand (ZA)

( * ) Notice: Subject to any disclaimer, the term of this patent is extended or adjusted under 35 U.S.C. 154(b) by 0 days.

(21) Appl. No.: 09/550,361

(22) Filed: Apr. 19, 2000

(30) Foreign Application Priority Data

Apr. 20, 1999 (ZA) ...................................................... 99/2830

(51) Int. Cl.[7] .............................. G06F 7/00; G06F 17/00; G01C 21/00

(52) U.S. Cl. ................................. 701/1; 701/200; 701/36; 340/438; 340/425.5

(58) Field of Search .................................. 701/1, 36, 200, 701/24; 340/870.1, 425.5, 438

(56) References Cited

U.S. PATENT DOCUMENTS 5,848,368 * 12/1998 Allen et al. ............................ 701/50
5,887,176   3/1999 Griffith et al. .

* cited by examiner

Primary Examiner—William A. Cuchlinski, Jr.
Assistant Examiner—Olga Hernandez
(74) Attorney, Agent, or Firm—Merchant & Gould P.C.

(57) ABSTRACT

A system 10 for monitoring the load on a load carrying vehicle comprises an electronic radio frequency (RF) identification system 22 comprising a reader 24 and a plurality of RF transponders 28.1 to 28.n. Each transponder is associated with a respective load item 36.1 to 36.n, and the items collectively constitute the load located in a load carrying region of the vehicle. The reader is operative in use to interrogate the transponders, to read response data received from the transponders and to generate data relating to a load change event. A controller 34 and a vehicle position data generating device 38 are connected to the controller. The controller is sensitive to a load change event and operative to record vehicle position related data corresponding to the load change event.

22 Claims, 3 Drawing Sheets

LOAD MONITORING SYSTEM AND METHOD UTILIZING TRANSPONDER TAGS

INTRODUCTION AND BACKGROUND

THIS invention relates to a system and method of monitoring a load on a vehicle and more particularly to such a system and method utilizing an electronic radio frequency (RF) identification system.

It is a well known problem that while goods are being transported from a depot of a factory for example, to a destination station which may be a warehouse of a retailer of the goods, some of the goods may be filched by operators of the transporting truck or workers at the depot or destination. In the case of very valuable goods, for example pharmaceutical products, the transporting vehicle may be hi-jacked and the entire load robbed by the hi-jackers. It is often very difficult, if not impossible, to recover the stolen or robbed goods.

In U.S. Pat. No. 5,887,176 to Randtec Inc there is disclosed an inventory control system for use with a warehouse or the like and utilizing an electronic radio frequency (RF) identification system. The system comprises a reader or interrogator and a plurality of active RF transponders or tags each associated with a respective container or item to be monitored in the warehouse. In use, the reader interrogates the transponder population. The response signals from the transponders are processed by the reader and compared to an inventory stored in a database. If one transponder does not respond during such an interrogation step or cycle, an alarm signal is generated.

Although the system may be suitable for methods of inventory control in stores and warehouses, it is not suitable to solve the severe and still increasing problems of monitoring a load of containers or items in transit, where hi-jacking of transport vehicles is an ever-increasing problem.

OBJECT OF THE INVENTION

It is an object of the present invention to provide a system and method with which the applicant believes the aforementioned problems may at least be alleviated.

SUMMARY OF THE INVENTION

According to the invention there is provided a system for monitoring the load on a load carrying vehicle, the system comprising:

an electronic radio frequency (RF) identification system composing a reader and a plurality of RF transponders;

each transponder being associated with a respective load item, the items collectively constituting a load located in a load carrying region of the vehicle;

the reader being operative in use to interrogate the transponders, to read response data received from the transponders and to generate data relating to a load change event;

a controller connected to the reader;

vehicle position data generating means connected to the controller; and the controller being sensitive to a load change event and operative to record vehicle position related data corresponding to the load change event.

The load change event may be any one or both of addition of at least one item to the load and removal of at least one load item from the load.

The transponders may be active or passive transponders.

The system may also comprise timer means for generating time data connected to the controller and wherein the controller is operative to record time data corresponding to the load change event.

The system may further comprise a memory arrangement connected to the controller for storing the data recorded by the controller, for subsequent retrieval and analyses.

Inventory data comprising data relating to each of the items in the load may also be stored in the memory arrangement.

The controller may be operative in real time to update the inventory data or a manifest with data relating to an item added to the load, each time an item is added to the load.

The transponders may be interrogated in cycles and the controller preferably generates data relating to a load change event if response data read during an interrogation cycle does not correspond to the inventory data.

The vehicle position data generating means may comprise a global positioning system (GPS) transceiver connected to the controller or any other position determining or fixing system.

Alternatively or in addition, the vehicle position data generating means may comprise an odometer of the vehicle or a tachograph.

In the preferred embodiment, a transmitter is connected to the controller to transmit the data recorded by the controller in real time to a remote control station.

A pursuit and recovery team may be associated with the control station to act upon transmitted data relating to an event which is an unauthorized removal of at least one load item from the load.

The reader may be programmed to interrogate the transponders according to any one or more of the following patterns: continuously, intermittently, periodically and during predetermined events. A predetermined event is any one or more of the following: while a door of the load carrying region is open; when the door is closed; while the vehicle is stationary; and when motion is detected in the load carrying region.

Also included within the scope of the present invention is a method of monitoring a load on a load carrying vehicle, the method comprising the steps of:

providing on each of a plurality of items constituting a load carried on a load carrying region of the vehicle a respective transponder of a plurality of transponders of an electronic identification system;

interrogating the transponders with an interrogation signal from a reader of the system;

causing each transponder to respond to the interrogation signal with response date characteristic of that transponder;

reading the data;

comparing the data read to inventory data relating to the items in the load; and in the event of a difference between the data read and the inventory data, recording a load change event and vehicle position data corresponding to the load change event.

Further according to the method time data corresponding to the load change event may also be recorded.

The position data may comprise data relating to at least one of position coordinates of the vehicle; and a distance from a reference position. The position coordinate data may be determined utilizing a global positioning system and the distance data may be determined utilizing an odometer of the vehicle.

The time data may be determined by a real time clock.

The transponders may be interrogated according to any one or more of the following patterns: continuously, intermittently, periodically and during predetermined events.

In a preferred embodiment of the invention and in the event of a load change event, data relating to the load change event and vehicle position data are transmitted to a remote control station.

The data relating to the event may also be stored in a memory arrangement for subsequent retrieval and analysis. At the control station, the data may be utilized to determine the location of the load at the time of the event and/or to initiate a pursuit and recovery process.

BRIEF DESCRIPTION OF THE ACCOMPANYING DIAGRAMS

The invention will now further be described, by way of example only, with reference to the accompanying diagrams wherein.

DESCRIPTION OF A PREFERRED EMBODIMENT OF THE INVENTION

Figure 1:
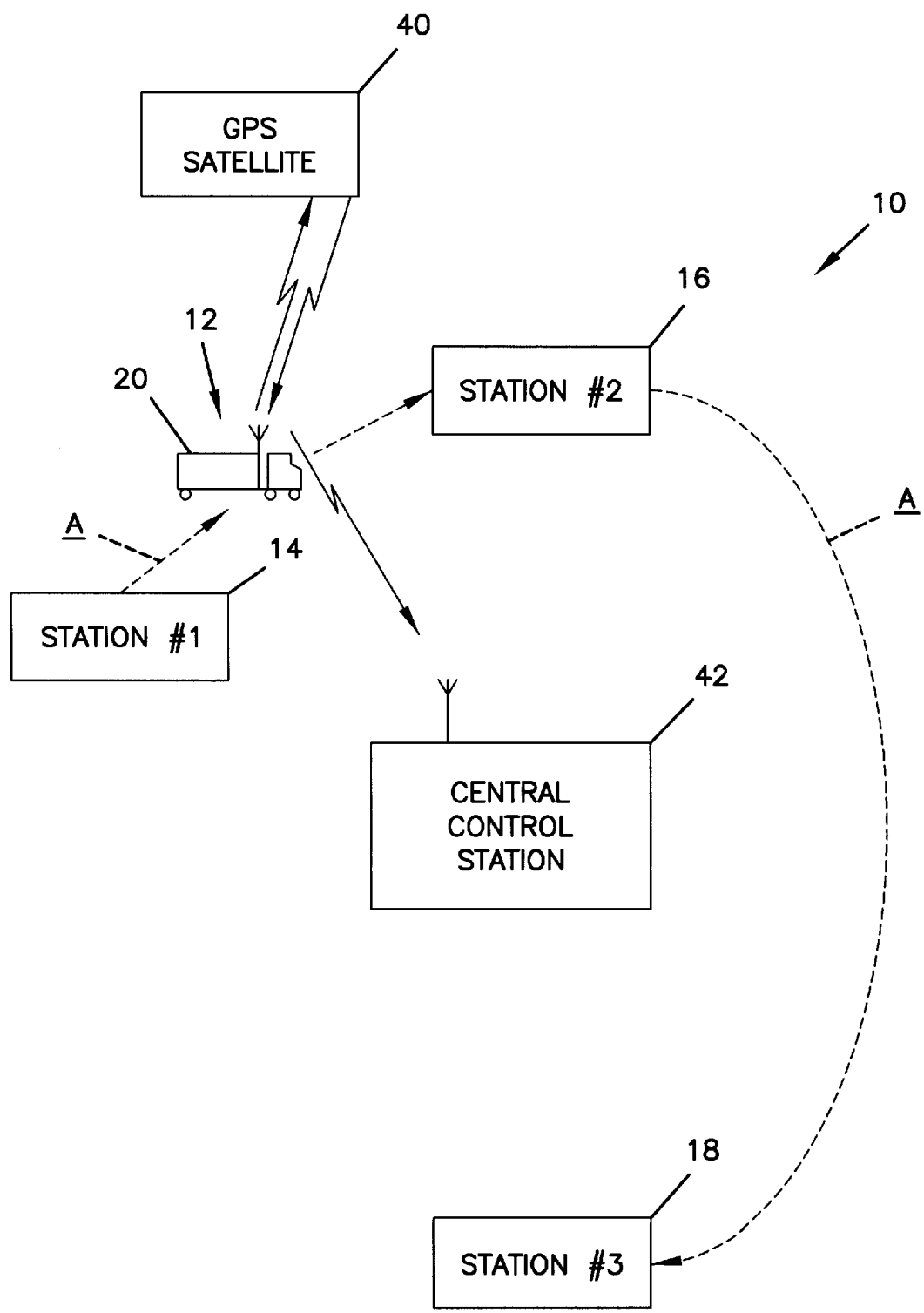
FIG. 1 is a block diagram of a load monitoring system for monitoring the load on a vehicle for transporting goods and which system includes an electronic RF identification system.

A system for monitoring the load on a vehicle 12 for transporting goods on a route A from a first station 14 via a second station 16 to a destination station 18 is generally designated by the reference numeral 10.

Route A is shown in broken lines in FIG. 1 and extends from the first station which may be a storage depot 14 via the second station 16 to destination station 18. Destination station 18 may be a warehouse on the premises of a retailer of the goods. Second station 16 may be a second depot and/or a destination station for part or all of the goods emanating from depot 14.

Vehicle 12, which is shown as a truck in FIG. 1, may also be another kind of land going vehicle or a water going vessel (not shown) or an aircraft or spacecraft (also not shown) of any kind. The vehicle includes a secure load-carrying region 20, which is also shown in FIG. 2, with an access door 21.

Figure 2:
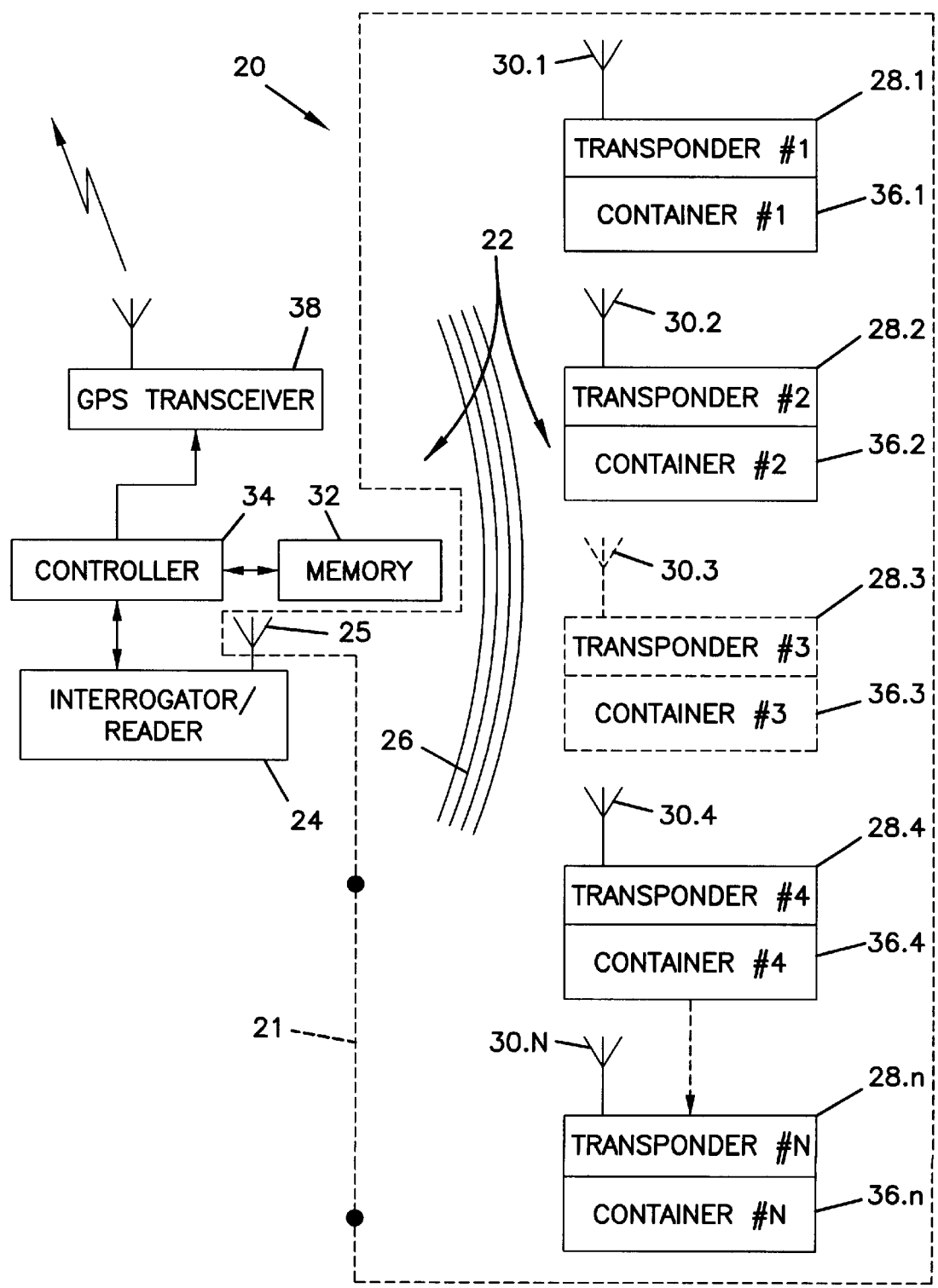
FIG. 2 is a block diagram of the electronic identification system for use on a load carrying region of the load transport vehicle.

As shown in FIG. 2, an electronic radio frequency (RF) identification system 22 comprises an interrogator or reader 24 for transmitting via antenna 25 interrogation signals 26 to a plurality of passive or active RF transponders 28.1 to 28.$n$. Each transponder includes a respective antenna 30.1 to 30.$n$ and circuitry (not shown, but well known in the art) for back-scatter modulating the interrogation signal with identification (ID) code data unique to the respective transponder and pre-stored in a memory arrangement (not shown) forming part of the circuitry of that transponder. The reader 24 is adapted to receive the back-scattered signals and to read the ID code data from the transponders sequentially (as is well known in the art). The data read is stored in memory arrangement 32 associated with controller 34 for the interrogator/reader 24.

Each transponder 28.1 to 28.$n$ is attached to an article or container 36.1 to 36.$n$ forming part of the load or cargo in the load-carrying of the vehicle. Thus, the ID code associated with the relevant transponder such as transponder 28.1 is also uniquely associated with container 36.1.

Figure 3:
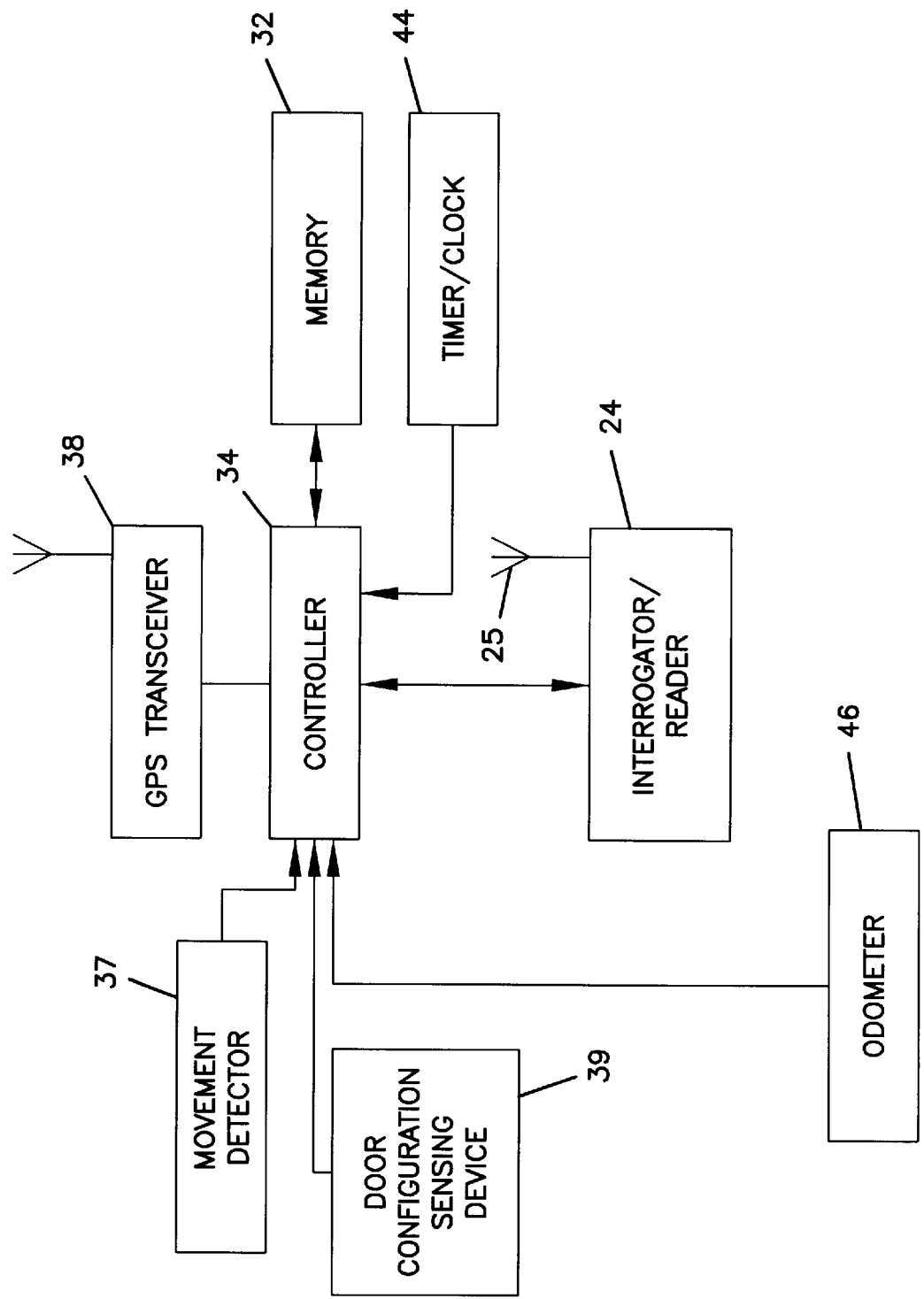
FIG. 3 is a more detailed diagram of an interrogator/reader of the monitoring system, which is hosted on the vehicle.

The controller 34 is programmed to cause the reader 24 at least intermittently to transmit the interrogation signal towards the loading zone 20 of the vehicle. The transponders 28.1 to 28.$n$ respond automatically as hereinbefore described and the ID code data is read by the interrogator 24, also as hereinbefore described. The interrogation signal may be transmitted continuously and the data be read cyclically. Alternatively, the signal may be transmitted periodically at a predetermined period. Further alternatively, the signal may be transmitted each time a door 21 of the load carrying region 20 is opened and while it remains open and/or when the vehicle 12 becomes stationary and remains stationary and/or when movement is detected in the load caring region 20 by movement detector 37, shown in FIG. 3 and/or when the door is closed. The configuration of the door is determined by door configuration sensing device 39 connected to the controller.

Upon loading the load (being the containers 36.1 to 36.$n$) onto the vehicle 12, an inventory of the containers including the ID code data with the transponders 28.1 to 28.$n$ and hence the containers 36.1 to 36.$n$ is stored in memory arrangement 32 of the controller 34. Along the route A, the load is monitored by transmission of the interrogation signal 26 and reading the ID code data as hereinbefore described. The inventory data is also updated automatically and in real time by the controller 34 as and when new containers or items are added to the load on the route.

The data read after each full cycle of reading ID codes, is compared by the controller to the inventory data in the memory arrangement 32.

If the data associated with one container (say container 36.3) or more of the containers 36.1 to 36.$n$ is not received, the position of the vehicle at that point along the route A is determined by a global positioning system (GPS) transceiver 38 connected to controller 34. The transceiver 38 cooperates in known manner with earth orbiting satellites 40 to determine position coordinate data of the vehicle 12. The determined data is stored with the ID code of the missing container 36.3 in the memory arrangement 32. The ID code data and position coordinate data may also be transmitted to a central control station 42, which in turn may respond with a pursuit and recovery team.

Data relating to the time when the container 36.3 was first found to be missing may also be read from a real time dock 44 (shown in FIG. 3) connected to the controller and may similarly be stored and transmitted as hereinbefore described. The same applies to distance data read from a odometer 46 or other distance metering device of the vehicle connected to the controller. Data relating to the time and position of an addition to the load may similarly be recorded and transmitted to the control station.

It will be appreciated that the aforementioned data and its availability at station 42 would greatly facilitate monitoring movement of the load and its recovery in the event of a theft or robbery. It will further facilitate management of the load and also accurate tracking of the load while in transit.

It will further be appreciated that there are many variations in detail on the system and method according to the invention without departing from the scope and spirit of the appended claims.

What is claimed is:

1. A system for monitoring the load on a load carrying vehicle, the system comprising:

an electronic radio frequency (RF) identification system comprising a reader and a plurality of RF transponders;

each transponder being associated with a respective load item, the items collectively constituting a load located in a load carrying region of the vehicle;

the reader being operative in use to interrogate the transponders, to read response data received from the transponders and to generate data relating to a load change event;

a controller connected to the reader;

vehicle position data generating means connected to the controller; and the controller being sensitive to a load change event and operative to record vehicle position related data corresponding to the load change event.

2. A system as claimed in claim 1 wherein the load change event is one of addition of at least one item to the load and removal of at least one load item from the load.

3. A system as claimed in claim 1 wherein each transponder is a passive transponder.

4. A system as claimed in claim 1 also comprising timer means for generating time data connected to the controller and wherein the controller is operative to record time data corresponding to the load change event.

5. A system as claimed in claim 1 wherein the vehicle position data generating means comprises a global positioning system (GPS) transceiver connected to the controller.

6. A system as claimed in claim 1 wherein the vehicle position data generating means comprises an odometer of the vehicle.

7. A system as claimed in claim 1 wherein the reader is programmed to interrogate the transponders according to any one or more of the following patterns: continuously, intermittently, periodically and during predetermined events.

8. A system as claimed in claim 7 wherein a predetermined event is any one or more of the following: while a door of the load carrying region is open; when the door is closed; while the vehicle is stationary and when motion is detected in the load carrying region.

9. A system as claimed in claim 1 wherein a transmitter is connected to the controller to transmit the data recorded by the controller in real time to a remote control station.

10. A system as claimed in claim 9 wherein a pursuit and recovery team is associated with the control station to act upon transmitted data relating to an event which is an unauthorized removal of at least one load item from the load.

11. A system as claimed in claim 1 comprising a memory arrangement connected to the controller for storing the data recorded by the controller.

12. A system as claimed in claim 11 wherein inventory data comprising data relating to each of the items in the load is also stored in the memory arrangement.

13. A system as claimed in claim 12 wherein the controller is operative in real time to update the inventory data with data relating to an item added to the load, each time an item is added to the load.

14. A system as claimed in claim 12 wherein the transponders are interrogated in cycles and wherein the controller generates data relating to a load change event if response data read during an interrogation cycle does not correspond to the inventory data stored in the memory arrangement.

15. A method of monitoring a load on a load-carrying vehicle, the method comprising the steps of:

providing on each of a plurality of items constituting a load carried on a load carrying region of the vehicle a respective transponder of a plurality of transponders of an electronic identification system;

interrogating the transponders with an interrogation signal from a reader of the system;

causing each transponder to respond to the interrogation signal with response date characteristic of that transponder;

reading the data;

comparing the data read to inventory data relating to the items in the load; and in the event of a difference between the data read and the inventory data recording a load change event and vehicle position data corresponding to the load change event.

16. A method as claimed in claim 15 wherein the transponders are interrogated according to any one or more of the following patterns: continuously, intermittently, periodically and during predetermined events.

17. A method as claimed in claim 15 wherein in the event of a load change event, data relating to the load change event and vehicle position data are transmitted to a remote control station.

18. A method as claimed in claim 15 wherein time data corresponding to the load change event is also recorded.

19. A method as claimed in claim 18 wherein the time data is determined by a real time clock.

20. A method as claimed in claim 15 wherein the vehicle position data comprises data relating to at least one of position coordinates of the vehicle; and data relating to a distance from a reference position.

21. A method as claimed in claim 20 wherein the position coordinate data is determined utilizing a global positioning system.

22. A method as claimed in claim 20 wherein the distance data is determined utilizing an odometer of the vehicle.

* * * * *